(12) United States Patent
Mekkat et al.

(10) Patent No.: US 9,916,164 B2
(45) Date of Patent: Mar. 13, 2018

(54) METHODS AND APPARATUS TO OPTIMIZE INSTRUCTIONS FOR EXECUTION BY A PROCESSOR

(71) Applicant: Intel Corporation, Santa Clara, CA (US)

(72) Inventors: Vineeth Mekkat, San Jose, CA (US); Girish Venkatasubramanian, Santa Clara, CA (US); Howard H. Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 14/737,058

(22) Filed: Jun. 11, 2015

(65) Prior Publication Data
US 2016/0364240 A1 Dec. 15, 2016

(51) Int. Cl.
*G06F 9/38* (2018.01)
*G06F 9/30* (2018.01)
*G06F 9/45* (2006.01)

(52) U.S. Cl.
CPC ............ *G06F 9/3861* (2013.01); *G06F 8/41* (2013.01); *G06F 9/30058* (2013.01); *G06F 9/3846* (2013.01)

(58) Field of Classification Search
CPC ...... G06F 9/3861; G06F 9/30058; G06F 8/41; G06F 9/3846
USPC ................ 717/151, 152, 153, 156, 159, 160
See application file for complete search history.

(56) References Cited

U.S. PATENT DOCUMENTS

| 5,920,716 | A | * | 7/1999 | Johnson .................. G06F 8/425 717/141 |
| 6,092,187 | A | | 7/2000 | Killian |
| 6,631,514 | B1 | * | 10/2003 | Le ........................ G06F 9/30174 712/E9.037 |
| 8,250,555 | B1 | * | 8/2012 | Lee ......................... G06F 8/445 717/132 |
| 8,412,914 | B2 | * | 4/2013 | Gonion .................. G06F 8/441 712/7 |
| 2001/0052120 | A1 | * | 12/2001 | Babaian ................ G06F 8/4441 717/160 |
| 2003/0023959 | A1 | * | 1/2003 | Park ...................... G06F 8/4451 717/151 |
| 2003/0110366 | A1 | | 6/2003 | Wu et al. |

(Continued)

OTHER PUBLICATIONS

NPL—Mahlke—Hyperblock—1992, Author: Mahlke et al., Article Titile: Effective Compiler Support for Predicated Execution Using the Hyperblock, IEEE 1992.*

(Continued)

*Primary Examiner* — Hossain Morshed
(74) *Attorney, Agent, or Firm* — Hanley, Flight & Zimmerman, LLC (57) ABSTRACT

Methods, apparatus, systems and articles of manufacture are disclosed herein. An example apparatus includes an instruction profiler to identify a predicated block within instructions to be executed by a hardware processor. The example apparatus includes a performance monitor to access a mis-prediction statistic based on an instruction address associated with the predicated block. The example apparatus includes a region former to, in response to determining that the mis-prediction statistic is above a mis-prediction threshold, include the predicated block in a predicated region for optimization.

21 Claims, 6 Drawing Sheets

(56) References Cited

U.S. PATENT DOCUMENTS

| | | | | |
|---|---|---|---|---|
| 2004/0194077 | A1* | 9/2004 | Bharadwaj | G06F 11/3612 717/158 |
| 2004/0210886 | A1* | 10/2004 | Jarp | G06F 8/4451 717/159 |
| 2007/0162896 | A1* | 7/2007 | Geva | G06F 8/443 717/130 |
| 2008/0034357 | A1* | 2/2008 | Gschwind | G06F 8/445 717/149 |
| 2009/0271772 | A1* | 10/2009 | Stephenson | G06F 9/45516 717/145 |
| 2010/0262813 | A1* | 10/2010 | Brown | G06F 8/433 712/240 |
| 2011/0012666 | A1* | 1/2011 | Manohar | G06F 17/5045 327/365 |
| 2011/0060889 | A1* | 3/2011 | Burger | G06F 9/3844 712/30 |
| 2011/0107071 | A1 | 5/2011 | Jacob | |
| 2013/0007424 | A1 | 1/2013 | Gorton, Jr. | |
| 2013/0258926 | A1* | 10/2013 | Osakada | H04W 52/04 370/311 |
| 2014/0122836 | A1* | 5/2014 | Gschwind | G06F 9/3017 712/205 |
| 2014/0282451 | A1 | 9/2014 | Vicente et al. | |
| 2015/0363201 | A1* | 12/2015 | Eickemeyer | G06F 9/3806 712/239 |
| 2016/0103683 | A1* | 4/2016 | Ueno | G06F 8/41 712/239 |

OTHER PUBLICATIONS

NPL—Chang—1996, Author: Chang et al., Article Title: Using Predicated Execution to Improve the Performance of a Dynamically Scheduled Machine with Speculative Execution, International Journal of Parallel Programming, vol. 24, No. 3, 1996.*

NPL—Park—1991, Author: Park et al., Article Titile: On Predicated Execution, Software and Systems Laboratory, HPL-91-58, May 1991.*

NPL—Hazelwood—Dynamic If-conversion, Author: Hazelwood et al., Article Title: A Lightweight Algorithm for Dynamic If-Conversion During Dynamic Optimization, Proceedings of the 2000, International Conference on Parallel Architectures and Compilation Techniques (PACT '00) Philadelphia, PA. Oct. 2000, pp. 71-80.*

NPL—Hawkins—Prediction Definition—2002, Title: HASE Prediction Project:, located at http://www.icsa.inf.ed.ac.uk/cgi-bin/hase/dlx-pred-m.pl?pred-t.html,pred-f.html,menu.html 2002.*

Mahlke, Article Title: "Effective Compiler Support for Predicated Execution Using the Hyperblock", IEEE 1992.*

Patent Cooperation Treaty, "International Search Report", issued in connection with International application No. PCT/US2016/031235, dated Aug. 17, 2016, (3 pages).

Patent Cooperation Treaty, "Written Opinion", issued in connection with International application No. PCT/US2016/031235, dated Aug. 17, 2016, (8 pages).

* cited by examiner

METHODS AND APPARATUS TO OPTIMIZE INSTRUCTIONS FOR EXECUTION BY A PROCESSOR

FIELD OF THE DISCLOSURE

This disclosure relates generally to instruction optimization, and, more particularly, to methods and apparatus to optimize instructions for execution by a processor.

BACKGROUND

Processors execute instructions to complete useful tasks. Modern processors use processor pipelines. When an instruction is loaded into a processor pipeline for execution, that instruction may not actually be executed by the processor until other instructions that are already in the pipeline are executed. In some examples, processors that execute instructions attempt to optimize those instructions prior to placing those instructions in the pipeline in an attempt to operate more efficiently. Such optimizations potentially result in instructions being executed out of their originally intended order. For example, the processor will, in some examples, speculatively execute portions of the code prior to those code portions being necessary, in an effort to optimize the performance of the processor.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Modern processors utilize instruction pipelines to increase instruction throughput. Instead of sequentially executing instructions (e.g., a first instruction is fully executed prior to executing a second instruction), instructions may be split up into a sequence of operations so that those operations can be executed in parallel (e.g., by different circuitry and/or at the same time). For example, an instruction may be split into a first operation to read the instruction from memory, a second operation to execute the instruction, and a third operation to write the result of the instruction to memory. As such, multiple instructions may be executed by a processor during a single clock cycle. To enhance efficiency, some processors attempt to re-organize instructions to ensure that the instruction pipeline is constantly full. However, such attempted optimizations can introduce latencies.

For example, when a processor executes conditional operation(s), such as an "IF" statement, a branch predictor of the processor may predict an outcome of the conditional statement and speculatively execute instructions (e.g., execute an "IF" statement as if it were resolved as TRUE) prior to such result being necessary. That is, the instructions of the conditional statement may be placed in the processor pipeline for execution even though the predicate on which the conditional statement is based has not yet been determined. If the branch predictor has properly estimated the predicate of the conditional statement, the result of the conditional statement is immediately available when the actual predicate is determined (e.g., no further instructions need to be executed). When the processor identifies that an incorrect speculative assumption was made (e.g., the incorrect predicate was predicted), instructions associated with the non-predicted predicate are executed (e.g., an "ELSE" portion of the "IF" statement). An incorrect speculative assumption is identified as a branch mis-prediction by the processor. The branch predictor may use the stored mis-prediction information to, for example, attempt to more accurately predict the predicate(s) of the conditional operation(s).

The cost of branch mis-prediction is high, particularly in an Out-Of-Order (OOO) processor. Even though the accuracy of the state-of-the-art branch predictor is high, the length of the pipeline in modern OOO processors makes branch mis-predictions costly on performance. Dynamic Binary Translation (DTB) systems can reduce the high penalty of branch mis-prediction using software optimization techniques, such an if-conversion. If-conversion reduces the impact of branch mis-prediction by converting the conditional statement into straight line code. As used herein, straight line code is code that results in execution of both branches (regardless of the predicted branch) and selection of the appropriate result based on evaluation of a predicate (as opposed to predicting the appropriate branch prior to execution).

As used herein, a block of instructions represents one or more sequential instructions. Because of their sequential nature, those instructions may be treated together (e.g., included in a region, excluded from a region, etc.). In some examples, execution of a block of instructions is based upon evaluation of a predicate. As used herein, a region is defined to include one or more blocks of instructions. In examples disclosed herein, a predicated region is a region that includes a predicated block (e.g., one or more instructions whose execution is dependent upon a predicate).

In DBT systems, selection of appropriate regions of instructions for if-conversion is important. When regions are selected that have high dynamic execution counts (e.g., regions that are executed frequently), resultant optimized instructions yields greater performance and/or power savings from the processor. When incorrect regions are selected for optimization, the effort expended to optimize the region used on instructions might outweigh the effect of the optimization.

Many DBT systems utilize an observed execution count of a region as an indicator of a future dynamic execution count of that region. However, used alone, this metric does not consider costs associated with mis-predictions that occur in association with that region. Moreover, regions formed solely based on the dynamic execution count of that region might be incomplete. For example, those regions might lack blocks related to high mis-prediction branches, particularly if those blocks have a low execution frequency.

Example methods, apparatus, and systems disclosed herein present a hardware/software co-designed scheme to improve the effectiveness of DBT systems. As disclosed herein, information concerning branch mis-predictions identified by the branch predictor of the processor are used to identify blocks of instructions for inclusion in a region of instructions for optimization. For example, when a block of instructions exhibits greater than a threshold number of mis-predictions, that block of instructions is included in its respective region despite not meeting a threshold execution frequency.

Figure 1:
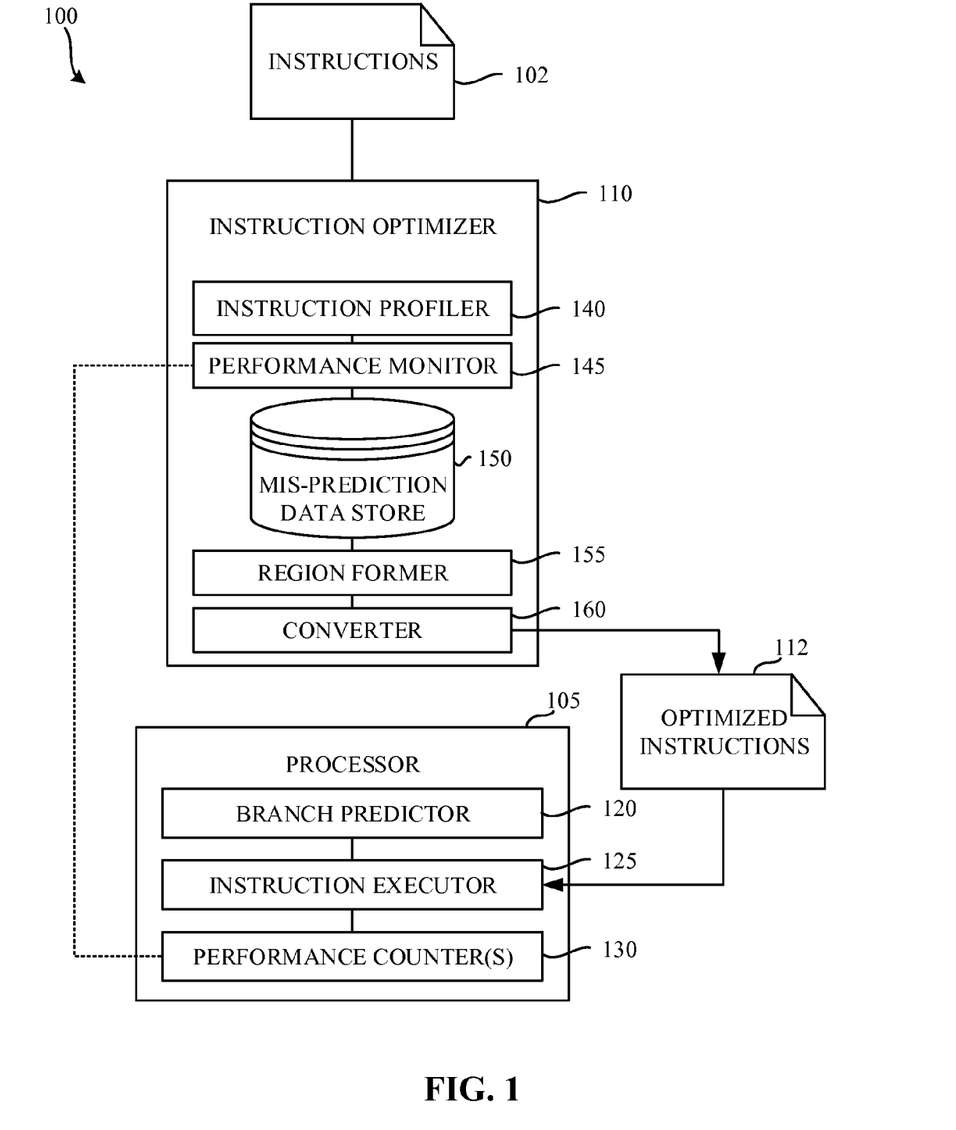
FIG. 1 is a diagram of an example computing system constructed in accordance with the teachings of this disclosure to optimize instructions for execution by a processor.

FIG. 1 is a diagram of an example computing system 100 constructed in accordance with the teachings of this disclosure to optimize instructions 102 for execution by a processor 105. The example computing system 100 includes an instruction optimizer 110 that receives instructions 102 for execution by the processor 105. The example instruction optimizer 110 optimizes the instructions 102 to form optimized instructions 112 for execution by the processor 105 in lieu of the instructions 102.

As disclosed herein, the instructions 102, 112 are machine instructions that are executed by the processor 105. Each instruction within the instructions 102, 112 performs a task such as, for example, adding two values, storing a value in a memory location, etc. In examples disclosed herein, the instructions are machine-readable instructions generated by a compiler. For example, the compiler may generate the machine-readable instructions based on human readable code (e.g., code created by a programmer using a human-readable programming language such as, for example, C++, JAVA, C#, etc.). However, the instructions may be generated in any other fashion such as, for example, by a human, generated by a compiler and modified by a human, etc.

The example processor 105 of the illustrated example of FIG. 1 is implemented by hardware. For example, the processor 105 can be implemented by one or more integrated circuits, logic circuits, microprocessors or controllers from any desired family or manufacturer. The example processor 105 of the illustrated example of FIG. 1 includes a branch predictor 120, an instruction executor 125, and a performance counter 130.

The example branch predictor 120 of the illustrated example of FIG. 1 identifies a branch (e.g., a conditional statement) within instructions to be executed by the instruction executor 125 of the processor 105. The example branch predictor 120 predicts which branch of instructions will be taken and forwards instructions of the predicted branch to the instruction executor 125. In some examples, branches are detected by detecting a conditional instruction (e.g., an instruction that is based on a predicate). However, any other approach to identifying a branch may additionally or alternatively be used. An example conditional statement is shown in the illustrated example of FIG. 2.

Upon detecting a conditional instruction, the branch predictor 120 predicts which predicate condition (e.g., TRUE, FALSE, etc.) will ultimately be used. In some examples, the branch predictor 120 predicts the predicate using a saturating counter. However, any other approach to predicting a predicate may additionally or alternatively be used such as, for example, a static prediction, a next line prediction, a two-level adaptive predictor, local branch prediction, global branch prediction, alloyed branch prediction, etc. Instructions associated with the predicted condition are provided to the instruction executor 125 for speculative execution. Upon determination of the true value of the predicate, the branch predictor 120 stores a record of the predicate in the performance counter 130 so that the branch predictor 120 can attempt to more accurately predict the predicate in the future. If, for example, it is determined that the predicted branch was incorrect (e.g., the incorrect instructions associated with the assumption were executed), the branch predictor 120 forwards the non-predicted instructions to the instruction executor 125 for execution. The speculatively executed and/or partially executed instructions (e.g., the instructions associated with the incorrect prediction) are discarded. More importantly, a delay is incurred as a result of the mis-prediction, as the non-predicted branch is executed later than it would have been if the correct predicate had been predicted.

The example instruction executor 125 of the illustrated example of FIG. 1 executes instructions provided by the branch predictor 120. In the illustrated example of FIG. 1, the example instruction executor 125 includes an instruction pipeline. Rather than sequentially processing each instruction (e.g., a first instruction is fully executed prior to executing a second instruction), each instruction is split up into a sequence of operations that are placed in the instruction pipeline so that those operations can be executed in parallel (e.g., by different circuitry and/or at the same time). The example instruction executor 125 executes those instructions in the instruction pipeline.

The example performance counter(s) 130 store performance metrics concerning instructions executed by the example instruction executor 125. In the illustrated example, the example performance counter(s) 130 store records of predicates and instruction addresses associated with those predicates. The predicate records are used by the example branch predictor 120 to predict the predicate for a given instruction address. As such, the performance counter(s) 130 store records of instances where the branch predictor 120 incorrectly predicted the predicate for a given instruction address. In some examples, the performance counter(s) 130 store information concerning the delay that was encountered as a result of the branch mis-prediction. Such information is made available to the instruction optimizer 110 so that the instructions may be optimized prior to inspection by the branch predictor 120.

The example instruction optimizer 110 of the illustrated example of FIG. 1 includes an instruction profiler 140, a performance monitor 145, a mis-prediction data store 150, a region former 155, and a converter 160. In some examples, the instruction optimizer 110 is implemented as a component of a dynamic binary translation (DBT) system. In examples disclosed herein, the instruction optimizer 110 is implemented using a hardware-based processor executing instructions.

The example instruction profiler 140 of the illustrated example of FIG. 1 estimates an execution frequency of an instruction of the instructions 102. In the illustrated example of FIG. 1, the example instruction profiler 140 interacts with the performance counter(s) 130 of the example processor 105 to determine a number of times that an instruction has been executed. The past knowledge of instruction execution is used to estimate a frequency at which an instruction will be executed in the future. However, the example instruction profiler 140 may utilize any other approach to estimate the execution frequency of an instruction. For example, the instruction profiler 140 may utilize hardware interrupts, code instrumentation, instruction simulation, etc. to estimate the execution frequency of an instruction.

The example performance monitor 145 of the illustrated example of FIG. 1 interacts with the performance counter(s) 130 of the example processor 105 to identify a mis-prediction statistic associated with an instruction address. As noted above, the branch predictor 120 of the processor 105 stores records of mis-predicted instructions in the performance counter(s) 130. In examples disclosed herein, the performance counter(s) 130 provide a list of one or more instruction addresses that were involved in mis-predictions. In some examples, the list of instruction addresses is ordered by a number of mis-prediction occurrences. In some examples, the performance counter(s) 130 provide instruction address(es) associated with the most frequent mis-predictions (e.g., the top ten mis-predictions). The example performance monitor 145 retrieves and stores the mis-prediction information in the mis-prediction data store 150. The mis-prediction information is later used by the region former 155 when determining whether a block of instructions should be included in a region selected for optimization.

The example mis-prediction data store 150 of the illustrated example of FIG. 1 stores mis-prediction information identified by the performance monitor 145. In the illustrated example, the mis-prediction data store stores instruction addresses in association with a number of times that a mis-prediction has occurred in association with that address. In examples disclosed herein, the example mis-prediction data store 150 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example mis-prediction data store 150 may additionally or alternatively be implemented by one or more double data rate (DDR) memories, such as DDR, DDR2, DDR3, mobile DDR (mDDR), etc. The example mis-prediction data store 150 may additionally or alternatively be implemented by one or more mass storage devices such as hard disk drive(s), compact disk drive(s), digital versatile disk drive(s), etc. While in the illustrated example the mis-prediction data store 150 is illustrated as a single database, the mis-prediction data store 150 may be implemented by any number and/or type(s) of databases.

The example region former 155 of the illustrated example of FIG. 1 groups blocks of instructions into regions of instructions for optimization. In examples disclosed herein, the example region former 155 utilizes mis-prediction information stored in the mis-prediction data store 150 to identify whether a block of instructions should be included in a region. In examples disclosed herein, the mis-prediction statistic is a number of occurrences of mis-predictions associated with an instruction address of the block. When the number of occurrences of mis-prediction is greater than or equal to a threshold value (e.g., more than fifty occurrences, greater than twenty percent mis-prediction, etc.), the block is included in the region.

Moreover, any other mis-prediction statistic may additionally or alternatively be used. For example, the mis-prediction statistic may represent a delay (e.g., thirty milliseconds, one hundred milliseconds, etc.) that is caused as a result of the branch predictor 120 mis-predicting a predicate of the block. If, for example, the delay is greater than a threshold amount of time (e.g., greater than one hundred milliseconds, greater than one second, etc.), the example region former 155 may include the block in the region.

Additionally or alternatively, the example region former 155 may utilize any other information to identify when a block of instructions is to be included in a region. For example, in some examples, the example region former 155 utilizes an estimated frequency of execution to identify whether a block of instructions should be included in the region.

The example converter 160 of the illustrated example of FIG. 1 optimizes the region of instructions identified by the example region former 155. Upon optimizing the region, the optimized region is provided to the processor 105 for execution. In some examples, multiple regions of instructions may be optimized and provided to the processor 105 for execution. In some examples, the branch predictor 120 of the processor 105 will not identify the optimized instructions as predicated instructions requiring speculative execution. As a result, potential delays associated with mis-prediction of the predicate are avoided.

In examples disclosed herein, the example converter 160 utilizes if-conversion to optimize the region. As used herein, if-conversion is an optimization that converts predicated statements into straight line code. An example if-conversion optimization is shown in the illustrated examples of FIGS. 2 and/or 3. However, any other optimization may additionally or alternatively be performed.

Figure 2:
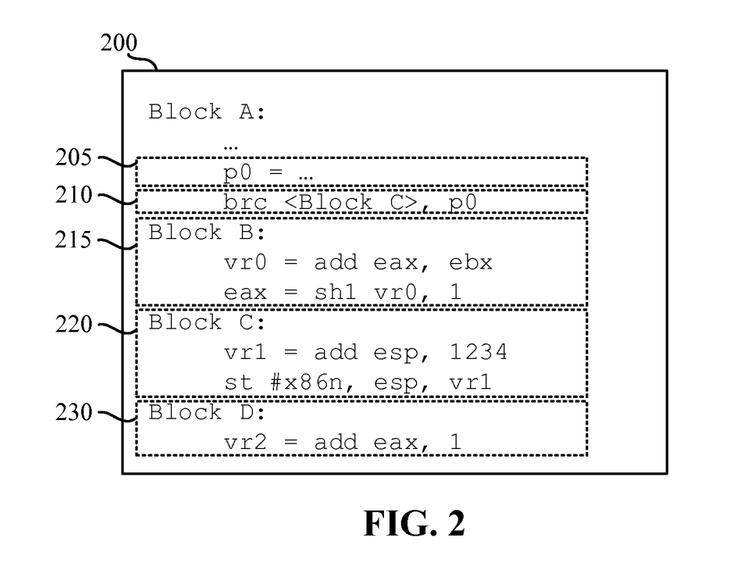
FIG. 2 illustrates an example set of instructions to be executed by the processor of FIG. 1.
Figure 3:
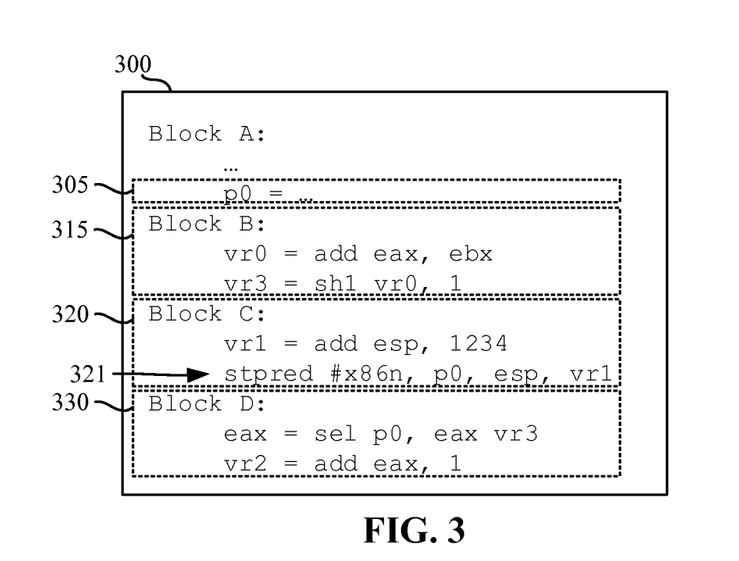
FIG. 3 illustrates an example optimized set of instructions to be executed by the processor of FIG. 1.

FIG. 2 illustrates an example region of instructions 200 to be executed by the processor 105. The example instructions 200 of FIG. 2 represent the un-optimized instructions 102 of FIG. 1. In the illustrated example of FIG. 2, a predicate (p0) is calculated. (Block 205). A branch instruction (Block 210) is executed based on the predicate. Based on the value of the predicate, the branch instruction either falls through to Block B (Block 215), or jumps to Block C (Block 220). If control proceeds to Block B (Block 215), the instructions of Block B are executed and control proceeds to Block C (Block 220) and then to Block D (Block 230). If control had jumped to Block C (Block 220), the instructions of Block C are executed and control proceeds to Block D (Block 230).

When executing the example instructions 200 of FIG. 2, the example branch predictor 120 of the processor 105 attempts to predict whether the predicate (p0) will be true of false. As such, Block B, Block C, and/or Block D may be executed prior to the branch instruction (Block 210) to avoid the necessity of waiting for the predicate to be calculated (Block 205). In examples where the predicate is unbiased, the example branch predictor 120 may not accurately predict the predicate, thereby resulting in significant delays associated with executing instructions, such as those of FIG. 2, from the non-predicted branch.

In examples disclosed herein, instructions may be optimized into straight line code, thereby removing the possibility that the branch will be mis-predicted by the branch predictor 120. In general, optimized straight line code includes fewer speculative instructions and, as a result, might take longer to execute than the non-speculative version of the instructions. However, the additional potential execution time outweighs the penalties associated with branch mis-prediction, particularly when optimization is selectively applied to instructions that are identified as associated with higher levels of mis-prediction.

FIG. 3 illustrates an example optimized region of instructions 300 to be executed by the processor 105. The example instructions 300 of the illustrated example of FIG. 3 correspond to the optimized instructions 112 of FIG. 1 and represent an optimized version of the instructions 200 of FIG. 2. In the illustrated example of FIG. 3, a predicate (p0) is calculated. (Block 305). Instead of including a branch instruction that operates based on the predicate, the instructions of FIG. 3 proceed directly to Block B. (Block 315).

Control proceeds to Block C. (Block 320). Compared with Block C of FIG. 2 (Block 220), Block C of FIG. 3 (Block 320) includes a predicated store instruction (Line 321), which stores a value depending on the calculated predicate (p0). The proper result is then selected in Block D (Block 330), and the instructions terminate. Notably, the conditional branch of Block 210 of FIG. 2 is removed in the illustrated example of FIG. 3. As such, the branch predictor 120 will not speculatively execute any of the blocks, thereby removing the possibility that the branch predictor will incorrectly predict the predicate.

In the illustrated example of FIG. 2, the instructions 200 include seven instructions. In the illustrated example, when the branch predictor 120 correctly predicts the predicate (p0) (Block 210), fewer than the seven instructions 200 of FIG. 2 may be executed (e.g., Block C (Block 215) may be skipped). However, if the branch predictor 120 were to incorrectly predict the predicate, additional instructions (e.g., the instructions of Block B (Block 215) that were incorrectly skipped by the branch predictor 120) may then be executed. While the illustrated example of FIG. 2, the various branches (e.g., Block B (Block 215), Block C (Block 220), etc.) each include two instructions, any other number(s) and/or type(s) of instruction(s) may additionally or alternatively be used. For example, the blocks may include ten instructions, one hundred instructions, one thousand instructions, etc. Blocks with many instructions tend to exhibit longer mis-prediction penalties than blocks with fewer instructions. As such, the penalty for mis-predicting a predicate may be high.

The instructions 300 of the illustrated example of FIG. 3, when executed, result in the same calculated result(s) as the instructions 200 of the illustrated example FIG. 2. In the illustrated example of FIG. 3, the instructions 300 also include seven instructions. Because the predicate branch instruction (e.g., the instruction of Block 210 of FIG. 2) is not included in the example instructions 300 of FIG. 3, the branch predictor 120 will not predict any predicates, and instead will execute all seven instructions in order. Removing the predicate determination also removes the potential for a branch mis-prediction on behalf of the branch predictor 120, thereby increasing the efficiency of the processor 105.

While an example manner of implementing the example processor 105 and/or the example instruction optimizer 110 are illustrated in FIG. 1, one or more of the elements, processes and/or devices illustrated in FIG. 1 may be combined, divided, re-arranged, omitted, eliminated and/or implemented in any other way. Further, the example branch predictor 120, the example instruction executor 125, the example performance counter(s) 130, and/or, more generally, the example processor 105, and/or the example instruction profiler 140, the example performance monitor 145, the example mis-prediction data store 150, the example region former 155, the example converter 160, and/or, more generally, the example instruction optimizer 110 of FIG. 1 may be implemented by hardware, software, firmware and/or any combination of hardware, software and/or firmware. Thus, for example, any of the example branch predictor 120, the example instruction executor 125, the example performance counter(s) 130, and/or, more generally, the example processor 105, and/or the example instruction profiler 140, the example performance monitor 145, the example mis-prediction data store 150, the example region former 155, the example converter 160, and/or, more generally, the example instruction optimizer 110 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example branch predictor 120, the example instruction executor 125, the example performance counter(s) 130, the example instruction profiler 140, the example performance monitor 145, the example mis-prediction data store 150, the example region former 155, the example converter 160, and/or the example instruction optimizer 110 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example processor 105 and/or the example instruction optimizer 110 of FIG. 1 may include one or more elements, processes and/or devices in addition to, or instead of, those illustrated in FIG. 4, and/or may include more than one of any or all of the illustrated elements, processes and devices.

Figure 4:
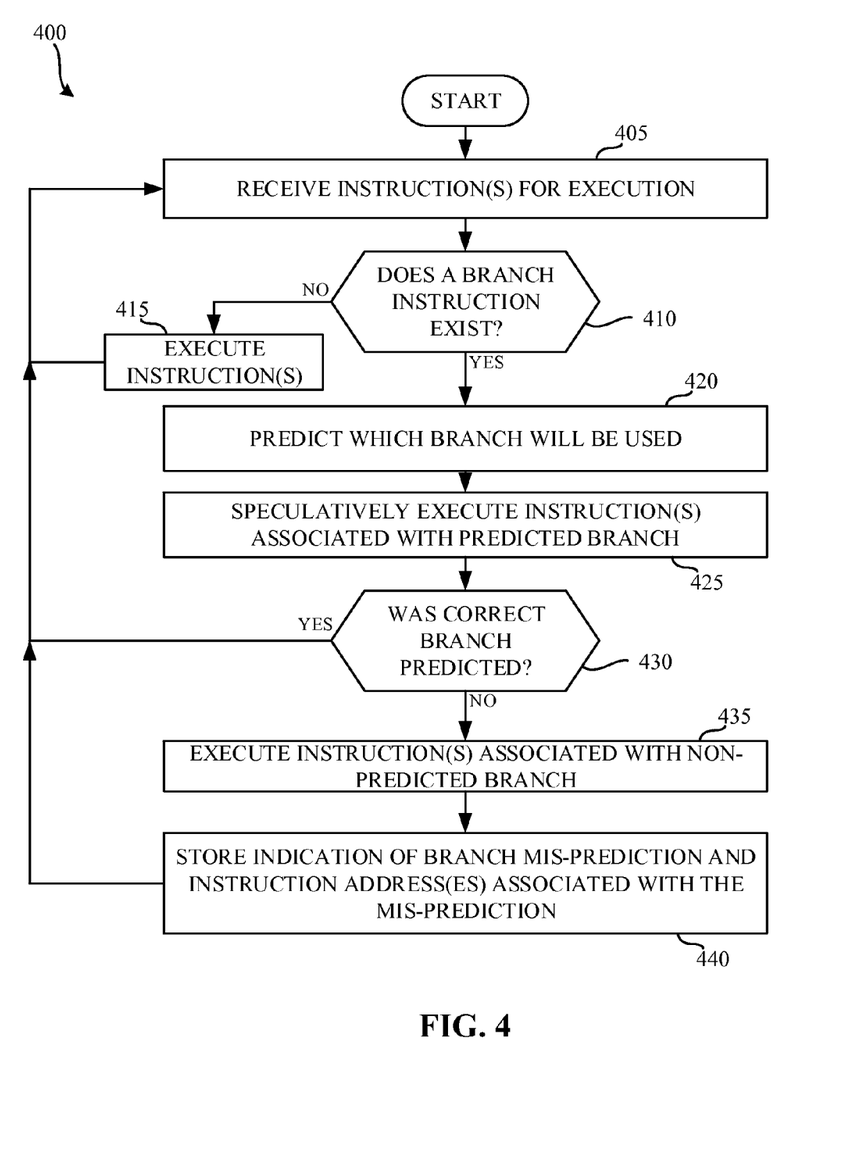
FIG. 4 is a flow diagram representative of example machine-readable instructions that may be executed to implement the example processor of FIG. 1.
Figure 5:
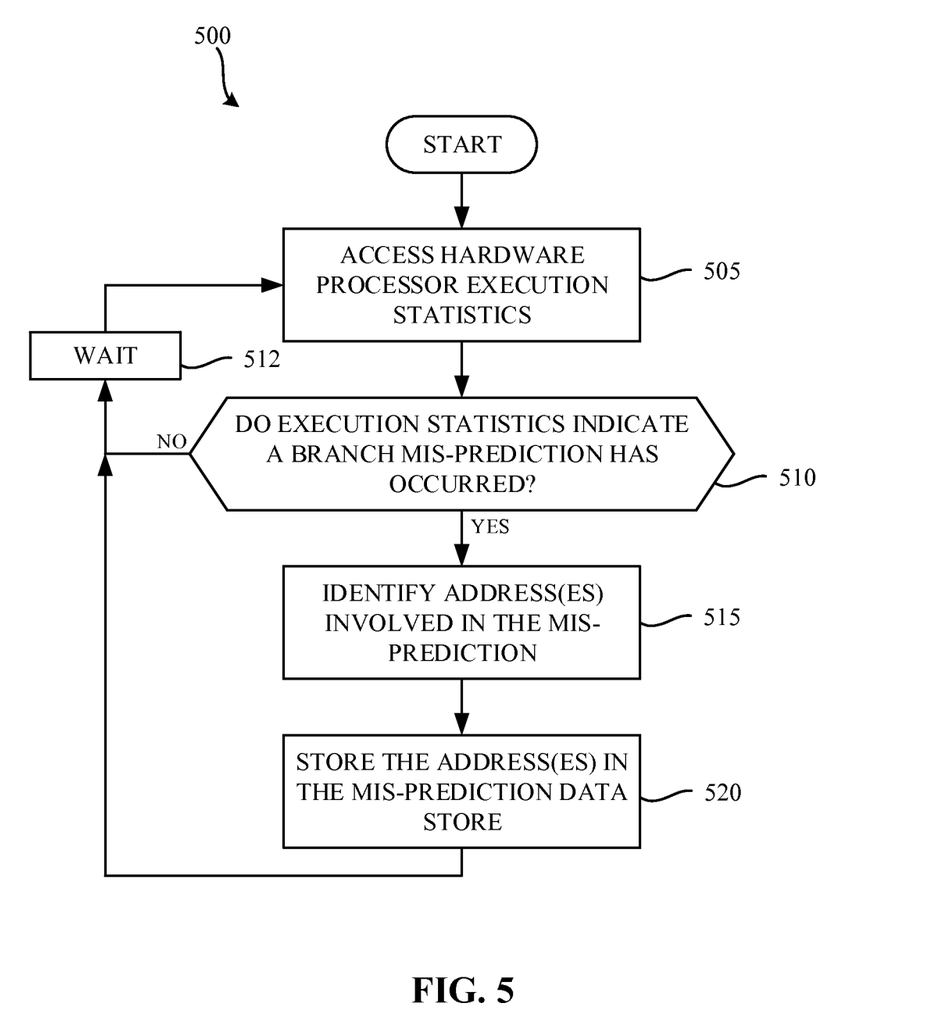
FIG. 5 is a flow diagram representative of example machine-readable instructions that may be executed to implement the example dynamic binary translator of FIG. 1.

A flowchart representative of example machine readable instructions for implementing the example processor 105 of FIG. 1 is shown in FIG. 4. Flowcharts representative of example machine readable instructions for implementing the example instruction optimizer 110 of FIG. 1 is shown in FIGS. 5 and/or 6. In these examples, the machine readable instructions comprise a program(s) for execution by a processor such as the processor 105 shown in the illustrated example of FIG. 1 and shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 105, but the entire program and/or parts thereof could alternatively be executed by a device other than the processor 105 and/or embodied in firmware or dedicated hardware. Further, although the example program is described with reference to the flowchart illustrated in FIGS. 4, 5, and/or 6, many other methods of implementing the example processor 105 and/or the example instruction optimizer 110 may alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flow diagram representative of example machine-readable instructions 400 that may be executed to implement the example processor 105 of FIG. 1. The example process of FIG. 4 begins when the example branch predictor 120 receives instructions(s) for execution. (Block 405). In the illustrated example of FIG. 4, the received instructions may be either un-optimized instructions (e.g., instructions corresponding to the instructions 102 of FIG. 1), or may be optimized instructions (e.g., instructions corresponding to the optimized instructions 112 of FIG. 1). The example branch predictor 120 inspects the instruction(s) to determine whether a branch instruction exists. (Block 410). In examples disclosed herein, a branch instruction is detected based on the presence of a branch operational code (op code). However, any other approach to detecting a branch instruction may additionally or alternatively be used such as, for example, detecting a jump command, an if-else command, a for command, a while command, etc. If no branch instruction is detected (Block 410 returns a result of NO), the instruction executor 125 executes the instructions. (Block 415).

If a branch instruction is detected (Block 410 returns a result of YES), the branch predictor 120 predicts which branch will be taken (e.g., the value of the predicate on which the branch instruction is based is predicted). (Block 420). In examples disclosed herein, the example branch predictor 120 predicts the predicate using a saturating counter. However, any other approach to predicting which branch predicting a predicate may additionally or alternatively be used such as, for example, a static prediction, a next line prediction, a two-level adaptive predictor, local branch prediction, global branch prediction, alloyed branch prediction, etc.

The instruction executor 125 speculatively executes the instructions associated with the predicted branch. (Block 425). When speculatively executing the instructions, the example instruction executor may store the results of the executed instructions in a memory location of the processor 105 (e.g., a register) such that the result can later be accessed when the predicate is finally determined.

The branch predictor 120 then waits to determine if the correct branch was predicted. (Block 430). If the correct branch was predicted (Block 430 returns a result of YES), the speculative result calculated in Block 425 is used, and the branch predictor 120 awaits further instructions at Block 405. If the correct branch was not predicted (Block 430 returns a result of NO), the instructions associated with the non-predicted branch are executed by the instruction executor 125. (Block 435).

The performance counter then stores an indication of the branch mis-prediction and/or instruction addresses associated with the mis-prediction in a memory of the processor 105. (Block 440). Storing the indication of the branch mis-prediction enables the branch predictor 120 to utilize the mis-prediction information in an effort to reduce mis-predictions in the future. Moreover, the mis-prediction information is also made available to the performance monitor 145, so that the instruction optimizer 110 may optimize instructions prior to the branch predictor 120 determining whether speculative execution is to be used.

FIG. 5 is a flow diagram representative of example machine-readable instructions 500 that may be executed to implement the example instruction optimizer 110 of FIG. 1 to retrieve mis-prediction statistics from the processor 105. The example process of FIG. 5, when executed, enables the performance monitor 145 to access the performance counter(s) 130 of the processor 105 to retrieve information concerning branch mis-predictions of the branch predictor 120. The example process 500 of FIG. 5 begins when the example performance monitor 145 accesses a hardware processor execution statistic. (Block 505). In the illustrated example, the performance monitor 145 accesses the execution statistic via the performance counter(s) 130. However, the execution statistic may be accessed in any other fashion. The example performance monitor 145 determines whether the execution statistic indicates that a branch mis-prediction has occurred. (Block 510).

If no branch mis-prediction is identified, the example performance monitor 145 waits a threshold period of time. (Block 512). In the illustrated example, the threshold period of time is five seconds. However any other threshold may additionally or alternatively be used. In some examples, the performance monitor 145 waits until an event occurs (e.g., an interrupt is triggered, instructions are received by the instruction optimizer for optimization, etc.). In some examples, the example performance monitor 145 does not wait in-between accesses of the hardware processor execution statistic (i.e., Block 512 is omitted).

If a branch mis-prediction statistic is identified, the example performance monitor requests an address (or addresses) associated with the identified mis-prediction. (Block 515). The example performance monitor then stores the address(es) associated with the identified mis-prediction in the mis-prediction data store. (Block 520). In the illustrated example, an indication (e.g., a pointer) of the instructions identified in association with the mis-prediction are stored. However, any other approach to storing an indication of the identified mis-prediction may additionally or alternatively be used. For example, the example performance monitor 145 may initialize and/or increment a counter in association with the identified address(es) associated with the mis-prediction. The example performance monitor then waits (Block 512), before again accessing the hardware processor execution statistic. (Block 505).

Figure 6:
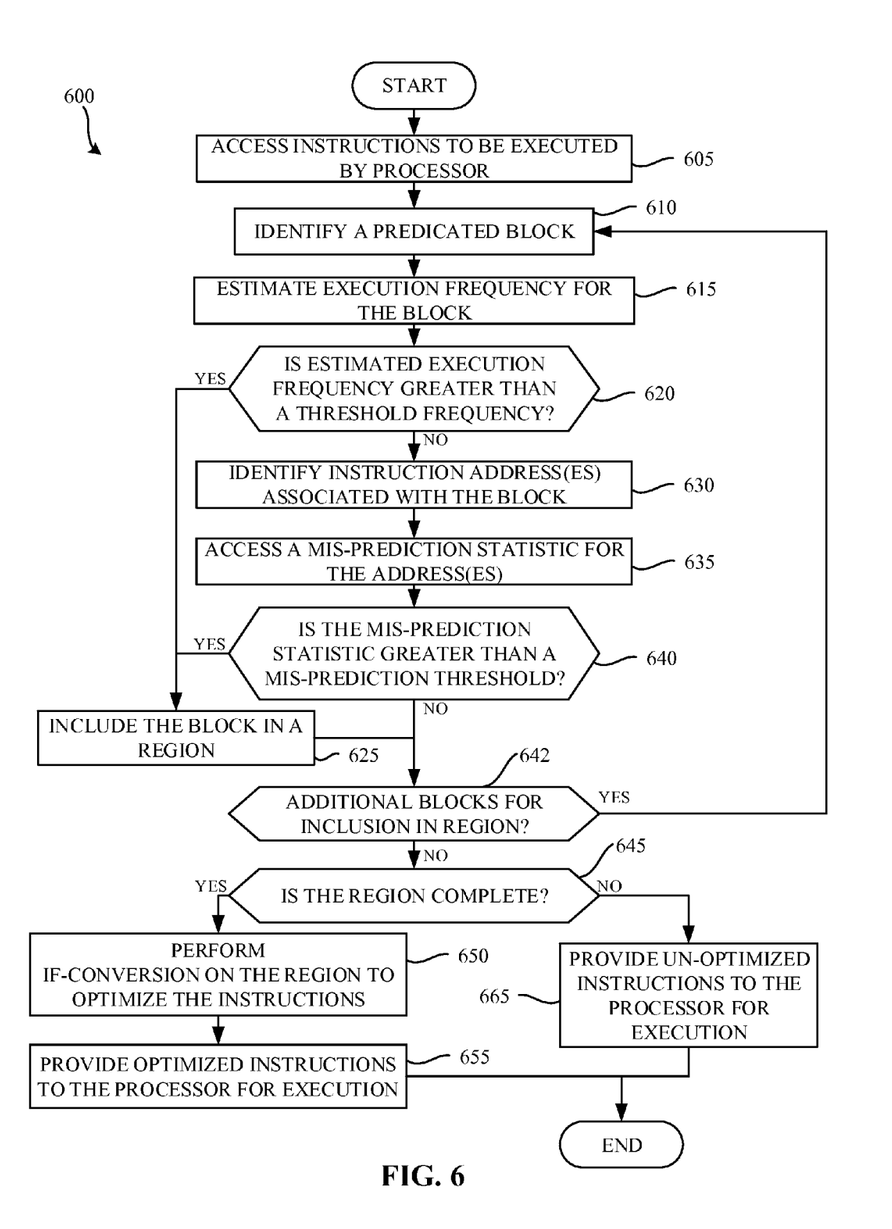
FIG. 6 is a flow diagram representative of example machine-readable instructions that may be executed to implement the example dynamic binary translator of FIG. 1.

FIG. 6 is a flow diagram representative of example machine-readable instructions 600 that may be executed to implement the example instruction optimizer 110 of FIG. 1. The example process 600 of FIG. 6 begins when the region former 155 accesses instructions to be executed by the processor 105. (Block 605). In the illustrated example of FIG. 6, the region former 155 accesses the instruction to be executed by the processor 105 during runtime (e.g., while a program is being executed). However, the example region former 155 may access the instructions at any other time and/or in any other fashion such as, for example, when the instructions are being complied.

The example region former 155 inspects the instructions to identify a predicated block. (Block 610). In the illustrated example, the predicated block is identified by locating a branch command within the instructions (e.g., the branch command 210 of FIG. 2). However, any other approach to identifying a predicated block may additionally or alternatively be used. For example, in some examples the region former 155 identifies an address used by the branch command to identify the predicated block.

The instruction profiler 140 then estimates an execution frequency for the identified block. (Block 615). In the illustrated example, the example instruction profiler 140 interacts with the performance counter(s) 130 of the example processor 105 to determine a number of times that instruction address(es) associated with the identified block have been executed within a given period of time (e.g., the past ten minutes, the past hour, etc.). The past knowledge of instruction execution is used to estimate a frequency at which the block will be executed in the future. However, the example instruction profiler 140 may utilize any other approach to estimate the execution frequency of the block. For example, the instruction profiler 140 may utilize hardware interrupts, code instrumentation, instruction simulation, etc. to estimate the execution frequency of the block.

The example region former 155 then determines whether the estimated execution frequency is greater than a threshold frequency. (Block 620). In some examples, logical operations other than a "greater than" comparison such as, for example, greater than or equal to, less than, less than or equal to, equal to, etc. may additionally or alternatively be used. In the illustrated example, the threshold execution frequency is one hundred times per minute. However, any other threshold frequency may additionally or alternatively be used. Moreover, factors other than the execution frequency may additionally or alternatively be used. For example, an execution count might be used to determine whether the block should be included in the region.

If the estimated execution frequency is greater than the threshold frequency (Block 620 returns a result of YES), the example region former 155 includes the block in a region. (Block 625). If the estimated execution frequency is not greater than the threshold frequency (Block 620 returns a result of NO), the example region former 155 identifies one or more instruction addresses associated with the block. (Block 630). The example region former 155 accesses a mis-prediction statistic stored in the mis-prediction data store 150 by the performance monitor 145 (e.g., as described in connection with FIG. 5), to identify whether the block should be included in a region. (Block 635).

In examples disclosed herein, the mis-prediction statistic is a number of occurrences of mis-predictions associated with the one or more instruction address(es) associated with the block. The region former 155 determines whether the mis-prediction statistic is greater than a mis-prediction threshold. (Block 640). In the illustrated example, the mis-prediction threshold is a number of occurrences (e.g., fifty mis-predictions, one hundred mis-predictions, etc.). However, the mis-prediction threshold may be represented in any other fashion such as, for example a percentage of mis-predictions associated with an instruction address as compared to a total number of executions of the instruction address (e.g., more than forty percent mis-predicted, more than seventy percent mis-predicted, etc.).

In some examples, a block may include multiple instructions. In such examples, mis-prediction statistics for each of the instruction address(es) associated with the block may be compared to the mis-prediction threshold. In some examples, the mis-prediction statistic for the block may be considered the greatest mis-prediction statistic of the instruction addresses associated with that block. However, any other approach to identifying a mis-prediction statistic for a block (as opposed to individual instructions within the block) may additionally or alternatively be used such as, for example, an average mis-prediction statistic of the instruction addresses associated with the block, a median mis-prediction statistic of the instruction addresses associated with the block, etc. Moreover, in some examples, block 640 is evaluated for each instruction address associated with the block, and results in a true result if any one or more of the mis-prediction statistic(s) of the instruction addresses associated with the block are greater than the mis-prediction threshold.

If the mis-prediction statistic is greater than the mis-prediction threshold (Block 640 returns a result of YES), the example region former 155 includes the block in the region. (Block 625). Once the region former 155 includes the block in the region (Block 625) or identifies that the mis-prediction statistic is not greater than the mis-prediction threshold (Block 640 returns a result of NO), the region former 155 determines whether any additional blocks exist for inclusion in the region. (Block 642). In the illustrated example, the region former 155 determines whether additional blocks exist that have not yet been analyzed by the region former 155. However, in any other approach to determining if additional blocks exist for inclusion in the region may additionally or alternatively be used. For example, the example region former 155 may determine whether the blocks are predicated on a same predicate as a prior block identified by the region former 155 (e.g., the block identified in Block 610). If additional blocks exist (Block 642 returns a result of YES), control proceeds to block 610, where the process of blocks 610 through 642 are repeated until no additional blocks are available for inclusion in the region.

When the example region former 155 determines that no additional blocks exist for inclusion in the region (Block 642 returns a result of NO), the example region former 155 determines whether the region is complete. (Block 645). In examples disclosed herein, the region is considered complete when the formed region includes at least two blocks that are associated with a same predicate. If the region is complete (Block 645 returns a result of YES), the example converter 160 performs if-conversion on the region to optimize the instructions. (Block 650). If-conversion reduces the impact of branch mis-prediction by converting the conditional statement into straight line code. An example if-conversion is disclosed above in connection with FIG. 3. However, any other optimization may additionally or alternatively be performed on the instructions. The optimized instructions are then provided to the processor 105 for execution by the region former 155 (Block 655). Returning to Block 645, if the region former 155 determines that the region is not complete (Block 645 returns a result of NO), the example region former 155 provides the un-optimized instructions to the processor 105 for execution (Block 665).

Figure 7:
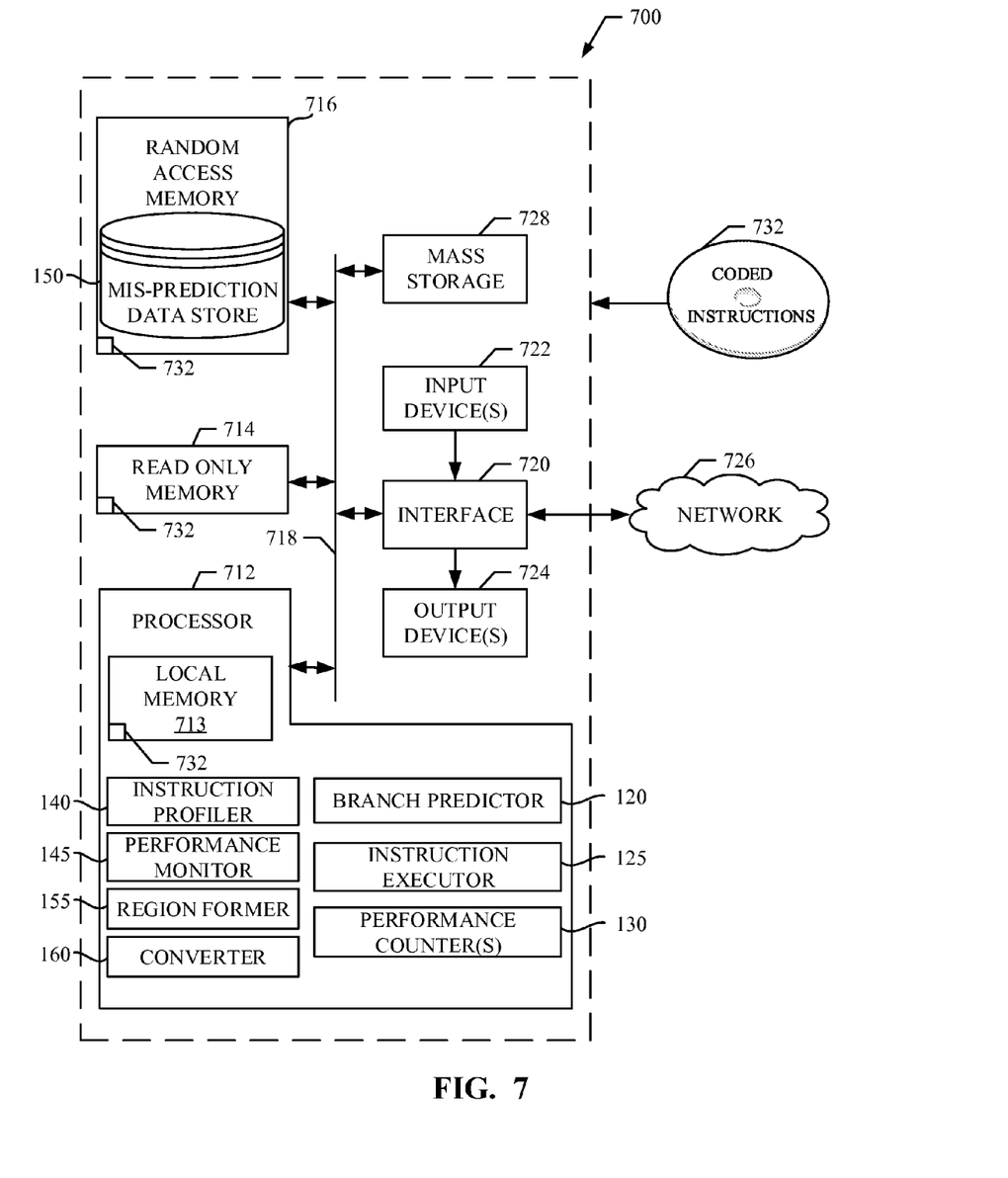
FIG. 7 is a block diagram of an example processor platform structured to execute the example machine-readable instructions of FIGS. 4, 5, and/or 6 to implement the computing system of FIG. 1.

FIG. 7 is a block diagram of an example processor platform 700 capable of executing the instructions of FIGS. 4, 5, and/or 6 to implement the example processor 105 and/or the example instruction optimizer 110 of FIG. 1. The processor platform 700 can be, for example, a server, a personal computer, a mobile device (e.g., a cell phone, a smart phone, a tablet such as an iPad™), a wearable, a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 105 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). In the illustrated example of FIG. 7, the processor 712 may implement the example branch predictor 120, the example instruction executor 125, the example performance counter(s) 130, the example instruction profiler 140, the example performance monitor 145, the example region former 155, and/or the example converter 160. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. In the illustrated example of FIG. 7, the example non-volatile memory 716 stores the mis-prediction data store 150.

The processor platform 700 of the illustrated example also includes an interface circuit 720. The interface circuit 720 may be implemented by any type of interface standard, such as, for example, an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4, 5, and/or 6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture enable inclusion of blocks of instructions in regions where if-conversion is to be applied. When regions are selected that have high dynamic execution counts (e.g., regions that are executed frequently), resultant optimized instructions yield greater performance and/or power savings from the processor. Moreover, by accounting for mis-prediction statistics of blocks for inclusion in the region(s), blocks of instructions that do not have a high dynamic execution count, but are frequently mis-predicted by a branch predictor of a processor, can be included in regions for optimization. Again, those resultant optimized instructions yield greater performance and/or power savings from the processor.

Examples may include subject matter such as a method, means for performing acts of the method, at least one machine-readable medium including instructions that, when performed by a machine cause the machine to perform acts of the method, or of an apparatus or system to optimize instructions for execution by a processor according to embodiments and examples described herein.

Example 1 is an apparatus to optimize instructions, the apparatus comprising an instruction profiler to identify a predicated block within instructions to be executed by a hardware processor. The example apparatus includes a performance monitor to access a mis-prediction statistic based on an instruction address associated with the predicated block. The example apparatus includes a region former to, in response to determining that the mis-prediction statistic is above a mis-prediction threshold, include the predicated block in a predicated region for optimization.

Example 2 includes the subject matter of Example 1, and further includes a converter to, in response to the block being included in the predicated region, optimize the predicated region to generate optimized instructions, the region former to provide the optimized instructions to the hardware processor.

Example 3 includes the subject matter of Example 2, wherein the converter is to optimize the predicated region in response to the region former determining that the predicated region is complete.

Example 4 includes the subject matter of Example 3, wherein the region former is to determine that the predicated region is complete by determining that the predicated region includes at least two predicated blocks.

Example 5 includes the subject matter of any one of Examples 1-4, wherein the performance monitor is to access the mis-prediction statistic from a performance counter of the hardware processor.

Example 6 includes the subject matter of any one of claims 1-5, wherein the mis-prediction statistic represents a number of times that the predicated block has been mis-predicted by a branch predictor of the hardware processor.

Example 7 includes the subject matter of any one of claims 1-6, and further includes an instruction profiler to estimate an execution frequency of the predicated block. The region former is to, in response to determining that the estimated execution frequency is above a threshold frequency, include the predicated block in the region.

Example 8 is a method of optimizing instructions, the method comprising identifying a predicated block within instructions to be executed by a hardware processor. The example method includes accessing a mis-prediction statistic based on an instruction address associated with the predicated block. The example method further includes, in response to determining that the mis-prediction statistic is above a mis-prediction threshold, including the predicated block in a predicated region.

Example 9 includes the subject matter of Example 8, and further includes in response to including the block in the predicated region, optimizing the predicated region to generate optimized instructions. Example 9 further includes providing the optimized instructions to the hardware processor.

Example 10 includes the subject matter of Example 9, wherein the optimization is performed in response to determining that the predicated region is complete.

Example 11 includes the subject matter of Example 10, wherein determining that the predicated region is complete includes determining that the predicated region includes at least two predicated blocks.

Example 12 includes the subject matter of any one of Examples 8-11, and further includes estimating an execution frequency of the predicated block. Example 12 further includes, in response to determining that the estimated execution frequency is above a threshold frequency, including the predicated block in the region.

Example 13 includes the subject matter of any one of Examples 8-12, wherein the mis-prediction statistic represents a number of times that the predicated block has been mis-predicted by a branch predictor of the hardware processor.

Example 14 includes the subject matter of any one of Examples 8-13, wherein optimizing the predicated region further includes performing if-conversion on the predicated region.

Example 15 includes the subject matter of any one of Examples 8-14 wherein the predicated block is a first predicated block, the instruction address is a first instruction address, the mis-prediction statistic is a first mis-prediction statistic. Example 15 further includes, in response to determining that the predicated region is incomplete, identifying a second predicated block within the instructions. Example 15 further includes accessing a second mis-prediction statistic based on a second instruction address of the second predicated block. Example 15 further includes, in response to determining that the second mis-prediction statistic is above the mis-prediction threshold, including the second predicated block in the predicated region.

Example 16 includes the subject matter of any one of Examples 8-15, wherein the instruction address is a first instruction address, the mis-prediction statistic is a first mis-prediction statistic. Example 16 further includes accessing a second mis-prediction statistic based on a second instruction address associated with the predicated block. Example 16 further includes, in response to determining that the second mis-prediction statistic is above the mis-prediction threshold, including the predicated block in the predicated region.

Example 17 is at least one tangible machine-readable medium comprising instructions which, when executed, cause a machine to at least identify a predicated block within instructions to be executed by a hardware processor; access a mis-prediction statistic based on an instruction address associated with the predicated block; and, in response to determining that the mis-prediction statistic is above a mis-prediction threshold, include the predicated block in a predicated region.

Example 18 includes the subject matter of Example 17, wherein the instructions, when executed, cause the machine to, in response to including the block in the predicated region, optimize the predicated region to generate optimized instructions; and provide the optimized instructions to the hardware processor.

Example 19 includes the subject matter of Example 18, wherein the optimization is performed in response to determining that the predicated region is complete.

Example 20 includes the subject matter of Example 19, wherein determining that the predicated region is complete includes determining that the predicated region includes at least two predicated blocks.

Example 21 includes the subject matter of any one of Examples 17-20, wherein the instructions, when executed, cause the machine to estimate an execution frequency of the predicated block; and, in response to determining that the estimated execution frequency is above a threshold frequency, include the predicated block in the region.

Example 22 includes the subject matter of any one of Examples 17-21, wherein the mis-prediction statistic represents a number of times that the predicated block has been mis-predicted by a branch predictor of the hardware processor.

Example 23 includes the subject matter of any one of Examples 17-22, wherein optimizing the predicated region further includes performing if-conversion on the predicated region.

Example 24 includes the subject matter of any one of Examples 17-23, wherein the predicated block is a first predicated block, the instruction address is a first instruction address, the mis-prediction statistic is a first mis-prediction statistic, and the instructions, when executed, cause the machine to, in response to determining that the predicated region is incomplete, identify a second predicated block within the instructions. The instructions of Example 24, when executed, cause the machine to access a second mis-prediction statistic based on a second instruction address of the second predicated block. The instructions of Example 24, when executed, cause the machine to, in response to determining that the second mis-prediction statistic is above the mis-prediction threshold, include the second predicated block in the predicated region.

Example 25 includes the subject matter of any one of Examples 17-24, wherein the instruction address is a first instruction address, the mis-prediction statistic is a first mis-prediction statistic. The instructions of Example 25, when executed cause the machine to access a second mis-prediction statistic based on a second instruction address associated with the predicated block; and, in response to determining that the second mis-prediction statistic is above the mis-prediction threshold, include the predicated block in the predicated region.

Example 26 is an apparatus comprising means for identifying a predicated block within instructions to be executed by a hardware processor. Example 26 further includes means for accessing a mis-prediction statistic based on an instruction address associated with the predicated block. Example 26 further includes means for, in response to determining that the mis-prediction statistic is above a mis-prediction threshold, including the predicated block in a predicated region.

Example 27 includes the subject matter of Example 26, and further includes means for, in response to including the block in the predicated region, optimizing the predicated region to generate optimized instructions. Example 27 further includes means for providing the optimized instructions to the hardware processor.

Example 28 includes the subject matter of Example 27, wherein the optimization is performed in response to determining that the predicated region is complete.

Example 29 includes the subject matter of Example 28, wherein the means for determining that the predicated region is complete includes means for determining that the predicated region includes at least two predicated blocks.

Example 30 includes the subject matter of any one of Examples 26-29, and further includes means for estimating an execution frequency of the predicated block. Example 30 further includes means for, in response to determining that the estimated execution frequency is above a threshold frequency, including the predicated block in the region.

Example 31 includes the subject matter of any one of Examples 26-30, wherein the mis-prediction statistic represents a number of times that the predicated block has been mis-predicted by a branch predictor of the hardware processor.

Example 32 includes the subject matter of any one of Examples 26-31, wherein the means for optimizing the predicated region further includes means for performing if-conversion on the predicated region.

Example 33 includes the subject matter of any one of Examples 26-32, wherein the predicated block is a first predicated block, the instruction address is a first instruction address, the mis-prediction statistic is a first mis-prediction statistic. Example 33 further includes means for, in response to determining that the predicated region is incomplete, identifying a second predicated block within the instructions. Example 33 further includes means for accessing a second mis-prediction statistic based on a second instruction address of the second predicated block. Example 33 further includes means for, in response to determining that the second mis-prediction statistic is above the mis-prediction threshold, including the second predicated block in the predicated region.

Example 34 include the subject matter of any one of Examples 26-33, wherein the instruction address is a first instruction address, the mis-prediction statistic is a first mis-prediction statistic. Example 34 further includes means for accessing a second mis-prediction statistic based on a second instruction address associated with the predicated block. Example 34 further includes means for, in response to determining that the second mis-prediction statistic is above the mis-prediction threshold, including the predicated block in the predicated region.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to optimize instructions, the apparatus comprising:
   an instruction profiler to identify a predicated block within instructions to be executed by a hardware processor;
   a performance monitor to, when an execution frequency of the predicated block is below an execution frequency threshold, access a mis-prediction count corresponding to the predicated block, the mis-prediction count representing a counted number of mis-prediction occurrences associated with two or more instruction addresses within the predicated block;
   a region former to, in response to determining that the mis-prediction count is above a mis-prediction threshold, include the predicated block in a predicated region for optimization; and
   a converter to, in response to the region former determining that the predicated region includes at least two blocks associated with a same predicate, optimize the instructions by converting the region into straight line code, at least one of the instruction profiler, the performance monitor, the region former, or the converter are implemented by the hardware processor.

2. The apparatus as disclosed in claim 1, wherein the region former is to provide the straight line code to the hardware processor.

3. The apparatus as disclosed in claim 1, wherein the performance monitor is to access the mis-prediction count from a performance counter of the hardware processor.

4. The apparatus as disclosed in claim 1, wherein the mis-prediction count represents a greatest number of mis-prediction occurrences associated with the two or more instruction addresses within the predicated block.

5. The apparatus as disclosed in claim 1, wherein the execution frequency is an estimated execution frequency, the region former to, in response to determining that the estimated execution frequency is above a threshold frequency, include the predicated block in the region.

6. A method of optimizing instructions, the method comprising:
   identifying a predicated block within instructions to be executed by a hardware processor;
   accessing, in response to an execution frequency of the predicated block being below an execution frequency threshold, and by executing an instruction with a processor, a mis-prediction count corresponding to the predicated block, the mis-prediction count representing a counted number of mis-prediction occurrences associated with two or more instruction addresses within the predicated block;
   in response to determining that the mis-prediction count is above a mis-prediction threshold, including the predicated block in a predicated region; and
   in response to determining that the predicated region includes at least two blocks associated with a same predicate, optimizing the predicated region by converting the predicated region into straight line code.

7. The method as disclosed in claim 6, further including providing the straight line code to the hardware processor.

8. The method as disclosed in claim 7, wherein the optimization is performed in response to determining that the predicated region is complete.

9. The method as disclosed in claim 6, wherein the execution frequency is an estimated execution frequency, and further including in response to determining that the estimated execution frequency is above a threshold frequency, including the predicated block in the region.

10. The method as disclosed in claim 6, wherein the mis-prediction count represents a greatest number of mis-prediction occurrences associated with the two or more instruction addresses within the predicated block.

11. The method as disclosed in claim 6, wherein optimizing the predicated region further includes performing if-conversion on the predicated region.

12. The method as disclosed in claim 6, wherein the predicated block is a first predicated block, the instruction address is a first instruction address, the mis-prediction count is a first mis-prediction count, and further including:

in response to determining that the predicated region is incomplete, identifying a second predicated block within the instructions;

accessing a second mis-prediction count based on a second instruction address of the second predicated block; and in response to determining that the second mis-prediction count is above the mis-prediction threshold, including the second predicated block in the predicated region.

13. The method as disclosed in claim 6, wherein the instruction address is a first instruction address, the mis-prediction count is a first mis-prediction count, and further including:

accessing a second mis-prediction count based on a second instruction address associated with the predicated block; and in response to determining that the second mis-prediction count is above the mis-prediction threshold, including the predicated block in the predicated region.

14. At least one tangible machine-readable storage medium comprising first instructions which, when executed, cause a machine to at least:

identify a predicated block within second instructions to be executed by a hardware processor;

access, in response to an execution frequency of the predicated block being below an execution frequency threshold, a mis-prediction count corresponding to the predicated block, the mis-prediction count representing a counted number of mis-prediction occurrences associated with two or more instruction addresses within the predicated block;

in response to determining that the mis-prediction count is above a mis-prediction threshold, include the predicated block in a predicated region; and in response to determining that the predicated region includes at least two blocks associated with a same predicate, optimize the predicated region by converting the region into straight line code.

15. The at least one tangible machine-readable storage medium as disclosed in claim 14, wherein the first instructions, when executed, cause the machine to provide the straight line code to the hardware processor.

16. The at least one tangible machine-readable storage medium as disclosed in claim 15, wherein the optimization is performed in response to determining that the predicated region is complete.

17. The at least one tangible machine-readable storage medium as disclosed in claim 14, wherein the execution frequency is an estimated execution frequency, and the first instructions, when executed, cause the machine to in response to determining that the estimated execution frequency is above a threshold frequency, include the predicated block in the region.

18. The at least one tangible machine-readable storage medium as disclosed in claim 14, wherein the mis-prediction count represents a greatest number of mis-prediction occurrences associated with the two or more instruction addresses within the predicated block.

19. The at least one tangible machine-readable storage medium as disclosed in claim 14, wherein optimizing the predicated region further includes performing if-conversion on the predicated region.

20. The at least one tangible machine-readable storage medium as disclosed in claim 14, wherein the predicated block is a first predicated block, the instruction address is a first instruction address, the mis-prediction count is a first mis-prediction count, and the first instructions, when executed, cause the machine to:

in response to determining that the predicated region is incomplete, identify a second predicated block within the second instructions;

access a second mis-prediction count based on a second instruction address of the second predicated block; and in response to determining that the second mis-prediction count is above the mis-prediction threshold, include the second predicated block in the predicated region.

21. The at least one tangible machine-readable storage medium as disclosed in claim 14, wherein the instruction address is a first instruction address, the mis-prediction count is a first mis-prediction count, and the first instructions, when executed, cause the machine to:

access a second mis-prediction count based on a second instruction address associated with the predicated block; and in response to determining that the second mis-prediction count is above the mis-prediction threshold, include the predicated block in the predicated region.

* * * * *